March 26, 1940.  T. H. VAUGHN ET AL  2,194,920
PROCESS OF DISPENSING VOLATILE WELDING FLUX
Filed Aug. 31, 1937
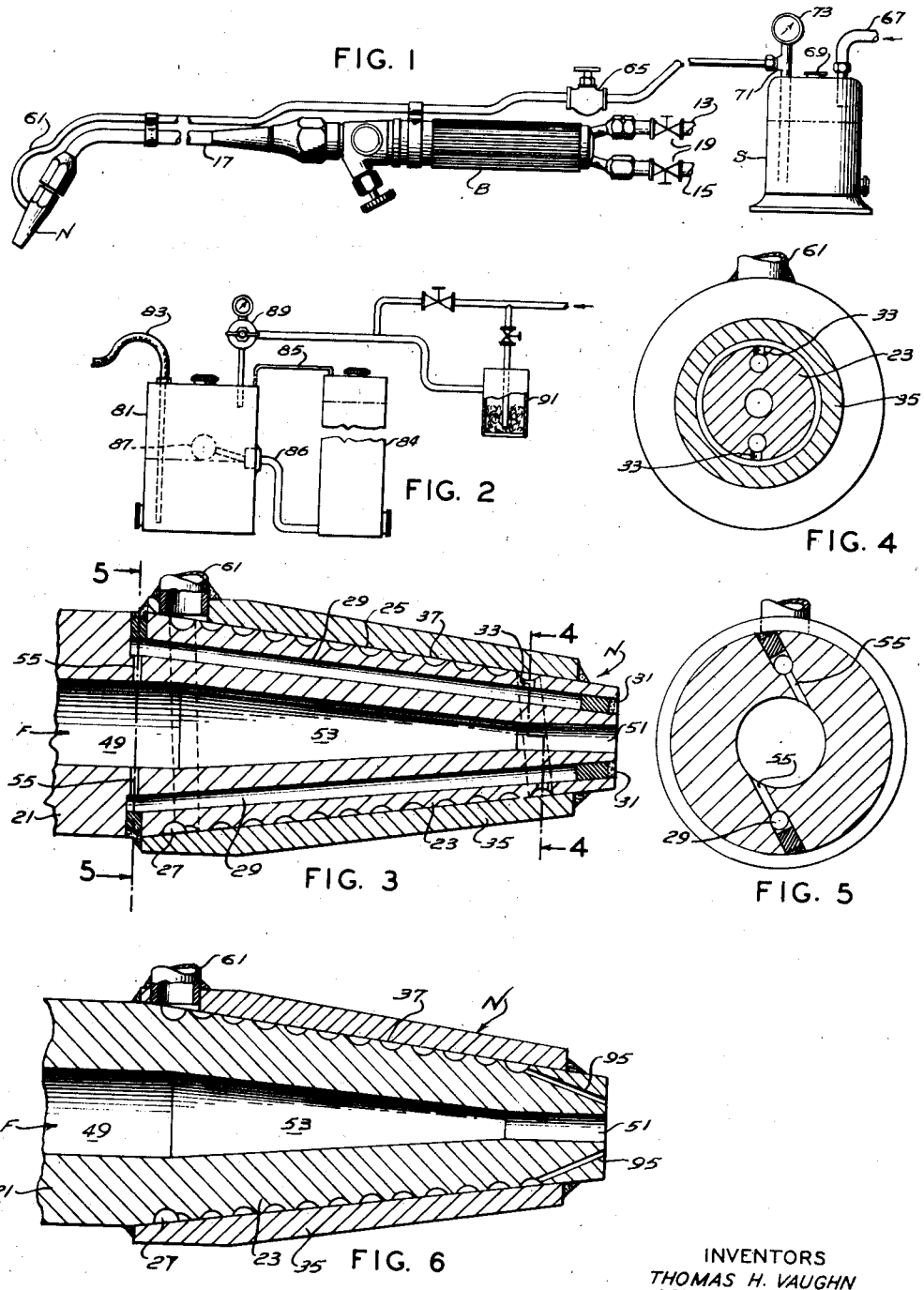
INVENTORS
THOMAS H. VAUGHN
ARTHUR R. LYTLE
JOHN M. GAINES, JR.
BY
ATTORNEY Patented Mar. 26, 1940

2,194,920

UNITED STATES PATENT OFFICE 2,194,920

PROCESS OF DISPENSING VOLATILE WELDING FLUX

Thomas H. Vaughn and Arthur R. Lytle, Niagara Falls, and John M. Gaines, Jr., Buffalo, N. Y., assignors to Union Carbide and Carbon Research Laboratories, Inc., a corporation of New York Application August 31, 1937, Serial No. 161,768

17 Claims. (Cl. 113—112)

This invention relates to a welding and brazing process and apparatus; and more especially it concerns a welding or brazing process and apparatus utilizing a volatile or volatilizable flux, that is, one which is either a liquid or gas at ordinary temperature, but is employed in the operation as a vapor or gas. The invention has special utility in operations involving the use of volatile flux compounds which readily hydrolyze in the presence of moisture to yield solid products.

Methods already are known for utilizing volatile fluxes in connection with welding and brazing operations. The practical methods of this type generally involve the uniform introduction into the stream of gases flowing to the welding operation of a regulated amount of the flux. Various means are utilized for introducing a uniform amount of the volatile flux into the welding gas flowing to the blowpipe nozzle, in order to insure that the most favorable conditions for the welding or brazing operation will be maintained at all times.

In so far as is known, most of the methods utilized for introducing continuously a uniform regulated amount of the flux to the torch nozzle have certain inherent disadvantages, due to the fact that many of the most effective volatile fluxes, such as the various organic borates and silicates, are readily hydrolyzed by moisture, even in such small amounts as occur in the welding gases used in welding and brazing operations. Upon hydrolysis, these compounds deposit the free acids in solid state, as boric acid, silicic acid, etc. Should these deposits occur in the gas passages in the blowpipes and other parts of the apparatus, such passages gradually become plugged so as seriously to interfere with the normal operation of the process. This is particularly likely to occur in connection with the use of a heavily moisture-laden gas such as low pressure-generated acetylene. Such acetylene is saturated with moisture at the existing temperature and pressure. Dissolved acetylene, i. e. acetylene which has been dissolved in certain solvents and stored under high pressure in cylinders, contains little moisture and can be used under limited conditions without drying it. When using other gases containing moisture, such as the above-mentioned low pressure generated acetylene, it frequently is necessary to dry the gas before contacting the volatile flux therewith, and thereafter to filter the gas, in order to insure continuous uniform operation of the blowpipe to which the fluid mixture is fed.

Low-pressure generated acetylene and other combustible gases flowing under pressures not greatly above atmospheric are difficult to dry and filter due to the low allowable pressure drop through the drier-filter-blowpipe system; and it often is difficult to prevent undue and uncontrolled variations in the pressure of the filtered gas flowing to the welding or brazing zone due to the resistance to flow through the filter resulting from the gradual deposit thereon of solid compounds formed by hydrolysis of the flux.

The present invention embraces a process and apparatus which insures the use of which insures at all times the uninterrupted flow to a welding or brazing zone of a selected amount of a volatile flux which will be continuous and invariable irrespective of whether or not the combustible gas and/or the oxygen-containing gas employed contains substantial amounts of moisture, or even is saturated therewith. The need for drying and of filtering the gases is eliminated.

According to the present invention the liquid volatilizable flux, or a solution of a volatile flux in a suitable solvent, is fed under substantially uniform pressure to a heating zone where it is heated, and preferably vaporized, and in the heated state it is introduced at a uniform rate and under a uniform regulated pressure either directly into the welding gas mixture at the welding zone, or into a stream of one or both of the welding gases flowing at usual velocity within a blowpipe, preferably adjacent its outlet.

Preferably the heating of the solution of flux is effected by the heat of radiation and convection from the welding flame and that emitted by the work at and adjacent the welding zone. The flux vapors thus formed are injected into the mixed gas stream, either at the base of the flame or within the gas passage of the blowpipe nozzle. It is unnecessary to employ fluxes having high vapor pressures at ordinary atmospheric temperature. Solutions in volatilizable solvents of fluxes having lower vapor pressures can be used. Moreover, since the entire liquid phase of the flux solution is vaporized, no change in the composition of the flux can occur, even when using liquid mixtures which would normally tend to "fractionate" and yield fractions of different compositions. It obviates the necessity of drying the fuel gas in the case of fluxes that hydrolyze in the presence of water vapor—e. g. trimethyl borate.

In the preferred practice of the invention a novel blowpipe is employed which is provided with a nozzle having an outer annular member so associated therewith as to define therebetween an elongated passage for the flux solution. During passage of the latter through this tortuous passageway the flux solution is heated by heat absorbed by the blowpipe nozzle from the welding zone and the highly-heated metal parts being welded. The fluid thus volatilized is then introduced under regulated pressure into the stream of welding gases within the blowpipe nozzle or adjacent the nozzle outlet. The velocity of the gas stream prevents any solid hydrolysis products from depositing in the nozzle passages, and insures uniform continuous operation of the blowpipe under any selected conditions.

Referring to the accompanying drawing which shows certain forms of apparatus adapted for the practice of the process of the invention, Fig. 1 is a general assembly view of a blowpipe and associated parts embodying the invention;

Fig. 2 is a general assembly view of a modified form of apparatus;

Fig. 3 is a longitudinal section through one form of blowpipe nozzle;

Fig. 4 is a transverse section taken along the lines 4—4 of Fig. 3, looking in the direction of the arrows;

Fig. 5 is a transverse section taken along the lines 5—5 of Fig. 3, looking in the direction of the arrows; and Fig. 6 is a longitudinal section through another modification of blowpipe nozzle.

Referring now to the drawing, the letter B designates a blowpipe of any suitable design, having the usual conduits 13 and 15 for conducting a combustible gas and oxygen or an oxygen-containing gas respectively to a mixing chamber therein (not shown). An outlet passage 17 of well known design connects the mixing chamber outlet with a blowpipe nozzle N. Regulating valves 19 control the respective gases flowing to the mixing chamber.

In the form illustrated in Figs. 3 to 5, the nozzle N comprises a tubular metal member 21 having a tapered forward end portion 23. The external surface of the tapered portion 23 has a spiral groove 25 formed in its midportion; and it has an annular groove 27 formed in the said surface at the larger end of the tapered portion, and intersecting the said spiral groove. Formed in the said tapered portion 23, as by drilling, are two or more passages 29 which are closed at each end. In the form illustrated in Fig. 3, two of such passages are shown, and they are closed at the forward end of the nozzle by metal plugs 31 silver soldered in place. A tapered tubular sleeve 35 of heat-conductive metal such as copper is pressed upon and over the external surface of the tapered portion 23 of the nozzle and has its ends secured to the latter as by silver soldering. Thus a fluid-tight spiral elongated passage 37 is provided between the nozzle 23 and the sleeve 35. One end of passage 37 communicates with the passage 29 through the passages 33. The other end of conduit 37 communicates with the annular groove 27.

The type of nozzle illustrated in Figs. 3 to 5 has a main fluid passage F including an inlet 49, a restricted fluid outlet passage 51 and an intermediate tapered portion 53, the construction being such that the gases flowing to the outlet increase in velocity as they approach the latter. For distributing volatile flux in regulated amounts within the stream of gases flowing to the nozzle outlet there are provided in the nozzle one or more passages 55 establishing communication between the main fluid passage F and that end of the passage 29 remote from the nozzle outlet. These passages 55 preferably are drilled in the nozzle N and are disposed tangentially of the walls of the said main fluid passage to facilitate quick and intimate intermixing of the welding gases and the flux. After the passages 55 are drilled, the outer portions of the holes thus made are plugged and sealed in suitable manner as by silver soldering.

For conducting a solution of volatile flux to the annular groove 27 of the nozzle N there is provided a conduit 61 having an end thereof soldered or otherwise suitably secured to the sleeve 35 at the said groove. The conduit 61 preferably is made of flexible copper, bronze or aluminum tubing. The opposite end of the said conduit 61 is connected with a storage container S adapted to hold a body of a solution of flux under regulated pressure and to feed the same from the container under control of a valve 65 in the conduit 61. The container shown in Fig. 1 has connected to its upper end a conduit 67 for conducting to the container a fluid such as air, or an inert gas such as nitrogen; an opening 69 for introducing the flux thereto and provided with a gas-tight closure; and a hollow fitting 71 having a tubular member adapted to extend below the liquid level in the container S and conduct the flux to the conduit 61. A pressure gauge 73 indicates the pressure existing in the latter.

Fig. 2 illustrates apparatus adapted for uniformly feeding a flux solution to the nozzle N when the gas pressure available for use in feeding the flux is variable. The apparatus shown includes a pressure-tight container 81 for the flux solution; a flexible metal conduit 83 corresponding to conduit 61 of Fig. 1; means including a flux storage vessel 84, a pressure-equalizing line 85, a flux inlet connection 86 controlled by a float valve 87 for maintaining a uniform depth of flux in the container 81; and means for introducing air or other gas into the container under a regulated uniform pressure. The last-named means includes a pressure-regulating valve 89 having its outlet connected with container 81 and its inlet connected with a source of gas under pressure. As shown, a gas drier 91 may be interposed between the regulator and the said source of gas. Such a drier when used may contain a dehydrating agent such as calcium chloride through which the gas is passed.

Fig. 6 illustrates a form of nozzle wherein the volatilized flux is introduced directly into the welding zone independently of the welding gases. Passages 95 extend through the nozzle tip, and are directed to discharge the flux into the gas stream. In this modification the passages 29, 33, and 55 are omitted.

The meal used in making the sleeve 35, and the depth and area of the spiral chamber 37 may be adjusted in accordance with the particular flux used and the amount of heat supplied by the particular nozzle and welding operation involved.

The passage 37 may be formed in the inner surface of the sleeve 35, or multiple heating passages may be used.

In practicing the process of the invention employing apparatus of the type illustrated, a volatilizable flux such as an alkyl borate, or a solution thereof in a volatile liquid such as an aliphatic alcohol, is placed in the container S. In one specific instance, 100% trimethyl borate was thus used. A suitable gas pressure then is applied to the liquid in the container S. Pressure of around 4 or 5 pounds per square inch are satisfactory, though higher and lower pressures also advantageously may be used. Air is usually employed as the pressure-transmitting agency. Whether or not the air or other gas used contains moderate quantities of moisture is not extremely important, since small amounts of boric acid thus formed are soluble in the liquid. Any solid matter thrown from solution in the event the liquid becomes supersaturated is deposited in the container and may be removed therefrom in simple manner. Clear liquid is transmitted under pressure through tubing 61, past valve 65. The liquid enters the heat exchange passage 37 of the nozzle where it is vaporized by heat from the welding zone. This vapor then is injected tangentially from two sides into the stream of welding gases in the main nozzle passage. This promotes intimate mixing of the gases and the flux during the short travel to the nozzle outlet. Should any solid boric acid be formed in the passages 55 when the blowpipe is not in service, due to moisture from the gas mixture entering said passages, the latter may be cleared by opening valve 65, whereupon a small amount of the liquid enters these passages and dissolves the boric acid.

The blowpipe gas valves then are opened and the gas mixture ignited. After the flame is adjusted in known manner, valve 65 is opened and regulated to supply the proper amount of flux to the gas mixture. When using an alkyl borate this may be determined by the green coloration imparted to the flame.

Other types of nozzles may be substituted for that shown without departing from the spirit of the invention. Thus the heat exchange unit may take the form of a spiral tubing encircling the outer wall of the nozzle; and the tubing or the jacket walls may have external fins or other means for increasing its heat-transferring capacity. Moreover, the volatilized flux may be introduced into the gases inside of the nozzle very close to the outlet; or it may be introduced into the welding zone direct from the passage 29 by means of apertures 95 in the nozzle tip, as shown in Fig. 6.

Welding tip vaporizers of the character herein described have amply demonstrated their ability to operate uniformly and continuously regardless of the presence of moisture in the fuel gas mixture being used. Thus, any type of combustible gas can be utilized, including those containing or even saturated with moisture, such as low-pressure generated acetylene; and the necessity for employing a purification train for the removal of moisture from the gases is avoided.

The invention is of especial value in connection with welding and brazing operations which utilize welding machines designed for continuous or semi-continuous operations on large or heavy objects.

Furthermore, it permits the employment of those liquid fluxes which, because of their low or variable vapor pressures, are not adapted for use in welding or brazing methods in use prior to the present invention. Triethyl borate and the higher alkyl borates and solutions thereof in methanol, ethanol, isopropanol or other alcohol in any proportions, are suitable for use in the process.

The term "welding" as used in the specification and claims is intended to embrace not only the usual high temperature welding operations, but to include brazing and soldering operations as well.

The expression "immediately adjacent the welding zone", and similar expressions in the specification and claims, are employed to designate points within the blowpipe nozzle, and also points adjacent the nozzle outlet which, in each case, are sufficiently close to said welding zone that substantially no hydrolysis of the flux, due to moisture present in the welding gas, occurs from the time of contact of the gas and flux until the mixture enters the welding zone.

The invention is capable of modification within the scope of the appended claims.

We claim:

1. Process for feeding a volatile flux to a welding zone, which comprises the steps of volatilizing the said flux immediately adjacent said welding zone by heat produced in the welding zone prior to introduction of the flux to said zone, immediately thereafter introducing the thus-volatilized flux into a stream of a welding gas at the welding zone, and preventing substantial decomposition of the flux prior to reaching said zone.

2. Process for feeding a volatile flux to a combustible mixture flowing to a welding zone, which comprises the steps of feeding the said flux to a welding nozzle, volatilizing the flux within the nozzle by the heat of the flame produced at the outlet of the said nozzle, and introducing the thus volatilized flux at a uniform rate into the gas mixture flowing within the said nozzle.

3. In the process for feeding a volatile flux to a welding zone, the step which comprises volatilizing immediately adjacent the welding zone successive portions of a body of said flux by heat produced by the combustion at the welding zone of a mixture of welding gases, and introducing the volatilized flux into a stream of welding gas at said welding zone.

4. Process for feeding a volatile flux to a combustible mixture flowing to a welding zone, which comprises the steps of continuously volatilizing successive portions of a flowing stream of said flux, immediately adjacent the welding zone, by heat produced at the welding zone by combustion of a portion of said mixture, and introducing the thus-volatilized flux into the said combustible mixture flowing to the welding zone at a point immediately adjacent said welding zone.

5. Process which comprises flowing to a welding zone an intimate mixture of welding gases containing a regulated amount of a volatile flux, burning said gas mixture in the welding zone, volatilizing additional flux immediately adjacent the welding zone by heat thus produced in said welding zone, and intimately mixing the thus-volatilized flux with unburned welding gases flowing to and immediately adjacent the said zone just prior to the introduction of said gases into said zone.

6. Process as defined in claim 5 wherein the flux comprises an organic borate.

7. Process as defined in claim 5 wherein the flux comprises an organic silicate.

8. Process for dispensing a volatilizable welding flux, which comprises feeding the said flux in liquid form under a uniform regulated pressure to a heating zone immediately adjacent a welding zone, volatilizing the flux in the said heating zone, introducing the volatilized flux into a welding gas mixture flowing under pressure within a blowpipe nozzle, combusting the resultant mixture at said welding zone, and utilizing heat thus generated for volatilizing additional liquid flux in the said heating zone immediately prior to introduction thereof into an additional quantity of the welding gas mixture.

9. Process for dispensing a hydrolyzable volatilizable welding flux, which comprises feeding the said flux under uniform pressure to a heating zone immediately adjacent a welding zone, volatilizing the flux in the said zone while preventing substantial variation in the flux composition, and introducing the volatilized flux into a moisture-containing gas mixture flowing to said welding zone at a point immediately adjacent said welding zone under conditions preventing substantial deposition of the flux from the resultant fluid mixture.

10. Process for feeding a volatile flux to a welding zone, which comprises conducting to a heating zone immediately adjacent said welding zone a flowing stream of a volatile hydrolyzable flux in liquid form under a uniform selected pressure, during such flow progressively volatilizing said liquid flux in the heating zone by heat transmitted thereto from said welding zone, and introducing the flux thus volatilized into a stream of a welding gas flowing to the welding zone at a point in said last-named stream immediately adjacent said welding zone.

11. Process as defined in claim 10, wherein the welding gas contains a substantial amount of moisture.

12. Process for feeding a volatile flux to a welding zone, which comprises conducting to a welding zone a flowing stream of a volatile flux in solution in a volatile solvent under a uniform selected pressure, during such flow progressively volatilizing said solution in a heating zone subjected to radiant heat produced in said welding zone while preventing substantial fractionation of the solution thus volatilized, and introducing the thus volatilized solution of flux into a welding gas flowing to said welding zone at a point immediately adjacent said welding zone.

13. Process for dispensing a volatilizable and hydrolyzable welding flux, which comprises feeding the said flux in liquid form under a uniform regulated pressure to a heating zone immediately adjacent a welding zone, heating the flux in the said heating zone, introducing the heated flux in vapor form into a moisture-containing welding gas flowing to a welding zone, at a point immediately adjacent said welding zone, while preventing substantial decomposition of the flux by said welding gas, promptly thereafter combusting the resultant mixture, and utilizing heat thus generated for heating additional flux fed to succeeding portions of the welding gas.

14. Process for feeding a volatilizable liquid flux to a welding zone, which comprises the steps of feeding the said flux to a welding torch nozzle, volatilizing the flux within the nozzle by means of radiant heat from a welding zone at the outlet of said nozzle, and introducing the thus volatilized flux at a uniform rate into a welding gas flowing through the nozzle to the welding zone.

15. Process for feeding a volatilizable flux to a welding zone, which comprises continuously flowing a confined stream of a hydrolyzable volatilizable flux solution under a substantially uniform pressure to a welding zone, heating successive portions of the flowing flux solution immediately adjacent the welding zone to increase its vapor pressure while preventing segregation of the components of said solution or hydrolysis of the flux, and introducing the thus heated flux solution into a stream of welding gas flowing to the welding zone at a point immediately adjacent said zone, thereby forming a mixture of said welding gas and vaporous flux.

16. Process for dispensing a volatilizable welding flux, which comprises feeding the said flux in liquid form under a uniform regulated pressure to a heating zone located within a blowpipe nozzle, volatilizing the flux in said zone, introducing the volatilized flux into a welding gas mixture flowing under pressure within said blowpipe nozzle, combusting the resultant mixture, and utilizing heat thus generated for volatilizing additional liquid flux in the said heating zone prior to introduction thereof into an additional quantity of the welding gas mixture.

17. Process for feeding a volatilizable flux to a welding zone, which comprises continuously flowing a confined stream of a hydrolyzable volatilizable flux solution under a substantially uniform pressure to a welding zone, heating successive portions of the flowing flux solution to increase its vapor pressure in a zone subjected to radiant heat from said welding zone, while preventing segregation of the components of said solution or hydrolysis of the flux, concurrently introducing a stream of a welding gas to said welding zone, and contacting the heated flux with the welding gas immediately adjacent the welding zone.

THOMAS H. VAUGHN.
ARTHUR R. LYTLE.
JOHN M. GAINES, Jr.